(12) United States Patent
Maeda et al.

(10) Patent No.: US 8,973,891 B2
(45) Date of Patent: Mar. 10, 2015

(54) AIR BYPASS VALVE DEVICE

(75) Inventors: Ryuichi Maeda, Tokyo (JP); Tatsuya Matsumoto, Tokyo (JP); Hisashi Yokoyama, Tokyo (JP); Yoshinori Sunagawa, Hyogo (JP); Keiichi Sakoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 310 days.

(21) Appl. No.: 13/517,001

(22) PCT Filed: Mar. 18, 2010

(86) PCT No.: PCT/JP2010/001952
§ 371 (c)(1),
(2), (4) Date: Jun. 18, 2012

(87) PCT Pub. No.: WO2011/114376
PCT Pub. Date: Sep. 22, 2011

(65) Prior Publication Data
US 2012/0256115 A1    Oct. 11, 2012

(51) Int. Cl.
*F16K 31/12* (2006.01)
*F02B 37/16* (2006.01)
*F02B 39/16* (2006.01)
*F16K 31/126* (2006.01)
*F02B 37/12* (2006.01)

(52) U.S. Cl.
CPC ............... *F02B 37/16* (2013.01); *F02B 39/16* (2013.01); *F16K 31/1262* (2013.01); *F16K 31/1266* (2013.01); *F02B 37/127* (2013.01); *Y02T 10/144* (2013.01); *Y10S 137/907* (2013.01)
USPC .............................. 251/61.5; 137/907

(58) Field of Classification Search
CPC ............. F16K 31/1262; F16K 31/1266; F02B 37/127; F02B 37/16
USPC ............. 251/61.5; 137/907; 60/611; 403/348
See application file for complete search history.

(56) References Cited

U.S. PATENT DOCUMENTS

| | | | | |
|---|---|---|---|---|
| 1,194,793 | A * | 8/1916 | Styers | 285/376 |
| 2,697,581 | A * | 12/1954 | Ray | 251/129.16 |
| 4,146,593 | A * | 3/1979 | Higashigawa | 251/61.5 |
| 4,208,361 | A * | 6/1980 | Ushijima et al. | 251/61.5 |
| 4,458,712 | A * | 7/1984 | Stevenson | 137/907 |
| 4,492,210 | A * | 1/1985 | Hunt | 137/907 |
| 4,497,335 | A * | 2/1985 | Masuda | 251/61.5 |

(Continued)

FOREIGN PATENT DOCUMENTS

| | | |
|---|---|---|
| DE | 102 51 981 A1 | 3/2005 |
| DE | 10 2006 013 291 A1 | 9/2007 |

(Continued)

*Primary Examiner* — Eric Keasel
(74) *Attorney, Agent, or Firm* — Birch, Stewart, Kolasch & Birch, LLP (57) ABSTRACT

An air bypass valve device includes a case 3 and a valve assembly 5, a tenon 3*l* is provided to one of the case 3 and the valve assembly 5, and a tenon groove 8*e* is provided to the other, such that the case 3 and the valve assembly 5 are united by a tenon insertion structure.

8 Claims, 12 Drawing Sheets

(56) References Cited

U.S. PATENT DOCUMENTS

| | | | |
|---|---|---|---|
| 4,517,803 A * | 5/1985 | Jamison | 60/611 |
| 5,035,228 A * | 7/1991 | Bender | 123/568.31 |
| 5,137,003 A | 8/1992 | Kyoya et al. | |
| 5,421,366 A * | 6/1995 | Naffziger et al. | 137/907 |
| 6,030,247 A | 2/2000 | Sasahara | |
| 8,678,343 B2 | 3/2014 | Czimmek et al. | |
| 2009/0087302 A1 | 4/2009 | Grzonkowski | |
| 2011/0006239 A1* | 1/2011 | Gerlich et al. | 251/331 |

FOREIGN PATENT DOCUMENTS

| | | |
|---|---|---|
| EP | 0 829 626 A1 | 3/1998 |
| JP | 60-110807 U | 7/1985 |
| JP | 2-305324 A | 12/1990 |
| JP | 8-6601 B2 | 1/1996 |
| JP | 10-208813 A | 8/1998 |
| WO | WO 2007/088043 A1 | 8/2007 |

* cited by examiner

AIR BYPASS VALVE DEVICE

TECHNICAL FIELD

The present invention relates to an air bypass valve device directly installed to a turbo charger, and particularly relates to the fitting of a case and a valve assembly.

BACKGROUND ART

Conventionally, a snap-fit system is employed for the fitting of a case and a valve assembly in this kind of air bypass valve device, as disclosed in Patent Document 1 and Patent Document 2. The fitting of the case and the valve assembly (assy) is not a matter which is directly relevant to an operating principle; however, if the fitting is not prepared, a spring, the case, and the valve assembly in which a holder, a diaphragm, and a valve are integrally assembled are put in an individual state as three parts until an installment thereof to a compressor housing of a turbo charger. For this reason, there is a problem such that the working efficiency for mounting the parts to the compressor housing is very bad.

In order to solve the above-described problem, a snap-fit unit is prepared for the valve assembly; when the valve assembly is fitted in and assembled to the case in a state where the spring is compressed and stored by a flange of the snap-fit unit, the three parts put in an individual state can be transported and handled as one part, to thereby enhance the working efficiency for mounting the parts to the compressor housing of the turbo charger.

However, a length of the snap-fit unit needs to be increased to obtain a sufficient flexure amount thereof depending on the material property (physical property) of parts to be used; as a result, it is difficult to decrease the total height of the air-bypass valve device, namely, to obtain a thinner one.

There is no problem when a flexible resin material such as PA66 can be employed for the snap-fit unit; however, in the case that the material is changed (the resin material is changed to PPS and so on) for the purpose of increasing the heat resistance, a structure with the same height could not be achieved due to the poor resistance to flexure. For this reason, the snap-fit unit needs to be elongated to obtain a sufficient flexure amount thereof; however, an elongated snap-fit unit interferes with a nipple as a pressure port that is prepared in the case, which poses a problem such that an operating stroke amount of a product is reduced.

In order to solve this problem, it can be considered to move the nipple in an upper direction; however, in order to move the nipple in the upper direction, the size of the case needs to be increased, which leads to an increase of the total height of the air bypass valve device, resulting in the degradation of the mountability thereof on vehicles.

PRIOR ART DOCUMENTS

Patent Documents

Patent Document 1: Japanese Patent Application Laid-Open No. H2-305324
Patent Document 2: Japanese Examined Patent Publication No. H8-006601

SUMMARY OF THE INVENTION

The present invention is made to solve the above-described problem, and an object of the invention is to provide an air bypass valve device that can maintain the total height of a product at a constant height without being affected by material properties (physical properties) thereof, and has superior mountability thereof on vehicles.

In an air bypass valve device of the invention, a tenon is provided to one of a valve assembly and a case, and a tenon groove is provided to the other, and after insertion of the tenon into the tenon groove, the valve assembly and the case are relatively rotated to be united, to thereby form a tenon insertion structure.

According to the air bypass valve device of the invention, since the case and the valve assembly are united by the tenon insertion structure, the total height of a product can be maintained at a constant height without being affected by material properties (physical properties) thereof. Further, since the case and the valve assembly can be handled and transported as one part, no fall-out of the valve assembly occurs during transport, and the working efficiency of mounting the device on the compressor housing of the turbo charger is enhanced.

BRIEF DESCRIPTION OF THE DRAWINGS

FIGS. 2(a)-1, 2(a)-2, 2(a)-3 are sectional views and a bottom view of a tenon groove formation part of the case, respectively, FIGS. 2(b)-1, 2(b)-2 are a plan view and a side view of a tenon formation part of the valve, respectively, and FIGS. 2(c)-1, 2(c)-2 are sectional views illustrating a tenon inserting state of the tenon groove formation part of the case and the tenon formation part of the valve, respectively.

FIGS. 3(a)-1, 3(a)-2, 3(a)-3 are sectional views and a bottom view of a tenon groove formation part of the case, respectively, FIGS. 3(b)-1, 3(b)-2 are a plan view and a side view of a tenon formation part of the valve, respectively, and FIGS. 3(c)-1, 3(c)-2 are sectional views illustrating a tenon inserting state of the tenon groove formation part of the case and the tenon formation part of the valve, respectively.

FIGS. 4(a)-1, 4(a)-2, 4(a)-3 are sectional views and a bottom view of a tenon groove formation part of the case, respectively, FIGS. 4(b)-1, 4(b)-2 are a plan view and a side view of a tenon formation part of the valve, respectively, and FIGS. 4(c)-1, 4(c)-2 are sectional views illustrating a tenon inserting state of the tenon groove formation part of the case and the tenon formation part of the valve, respectively.

FIG. 5 is an explanatory view illustrating a tenon insertion structure of a case and a valve according to Embodiment 4 of the invention, wherein FIGS. 5(a)-1, 5(a)-2, 5(a)-3 are sectional views and a bottom view of a tenon groove formation part of the case, respectively, FIGS. 5(b)-1, 5(b)-2 are a plan view and a side view of a tenon formation part of the valve, and FIGS. 5(c)-1, 5(c)-2 are sectional views illustrating a tenon inserting state of the tenon groove formation part of the case and the ten formation part of the valve, respectively.

FIGS. 7(a)-1, 7(a)-2, 7(a)-3 are a front view, a bottom view, and a side view of a tenon formation part, respectively, FIGS. 7(b)-1, 7(b)-2, 7(b)-3, 7(b)-4 are a plan view, a sectional view, a bottom view and a sectional view of a tenon groove formation part, and FIGS. 7(c)-1, 7(c)-2, 7(c)-3 are a plan view, a sectional view, a bottom view, and a sectional view of a tenon inserting state of the tenon formation part of the case and the tenon groove formation part of the valve, respectively.

FIGS. 8(a)-1, 8(a)-2, 8(a)-3 are a front view, a bottom view, and a side view of a tenon formation part, respectively, FIGS. 8(b)-1, 8(b)-2, 8(b)-3, 8(b)-4 are a plan view, a sectional view, a bottom view, and a sectional view of a tenon groove formation part, respectively, and FIGS. 8(c)-1, 8(c)-2, 8(c)-3 are a plan view, a sectional view, and a bottom view of a tenon inserting state of the tenon formation part of the case and the tenon groove formation part of the valve, respectively.

FIGS. 9(a)-1, 9(a)-2, 9(a)-3 are a front view, a bottom view, and a side view of a tenon formation part of the case, respectively, and FIGS. 9(b)-1, 9(b)-2, 9(b)-3, 9(b)-4 are a plan view, a sectional view, a bottom view, a sectional view of a tenon groove formation part of the holder, respectively, and FIGS. 9(c)-1, 9(c)-2, 9(c)-3 are a plan view, a sectional view, and a bottom view showing a tenon inserting state of the tenon formation part of the case and the tenon groove formation part of the valve, respectively.

FIGS. 13(a)-1, 13(a)-2, 13(a)-3 are a front view, a bottom view, and a side view of a tenon formation part of the case, respectively, FIGS. 13(b)-1, 13(b)-2, 13(b)-3, 13(b)-4 are a plan view, a sectional view, a bottom view, and a sectional view of a tenon groove formation part of the holder, respectively, and FIGS. 13(c)-1, 13(c)-2, 13(c)-3 are a plan view, a sectional view, and a bottom view of a tenon inserting state of the valve and the tenon groove formation part, respectively.

BEST MODE FOR CARRYING OUT THE INVENTION

In the following, embodiments of the present invention will be described with reference to the accompanying drawings.

Embodiment 1

Figure 1:
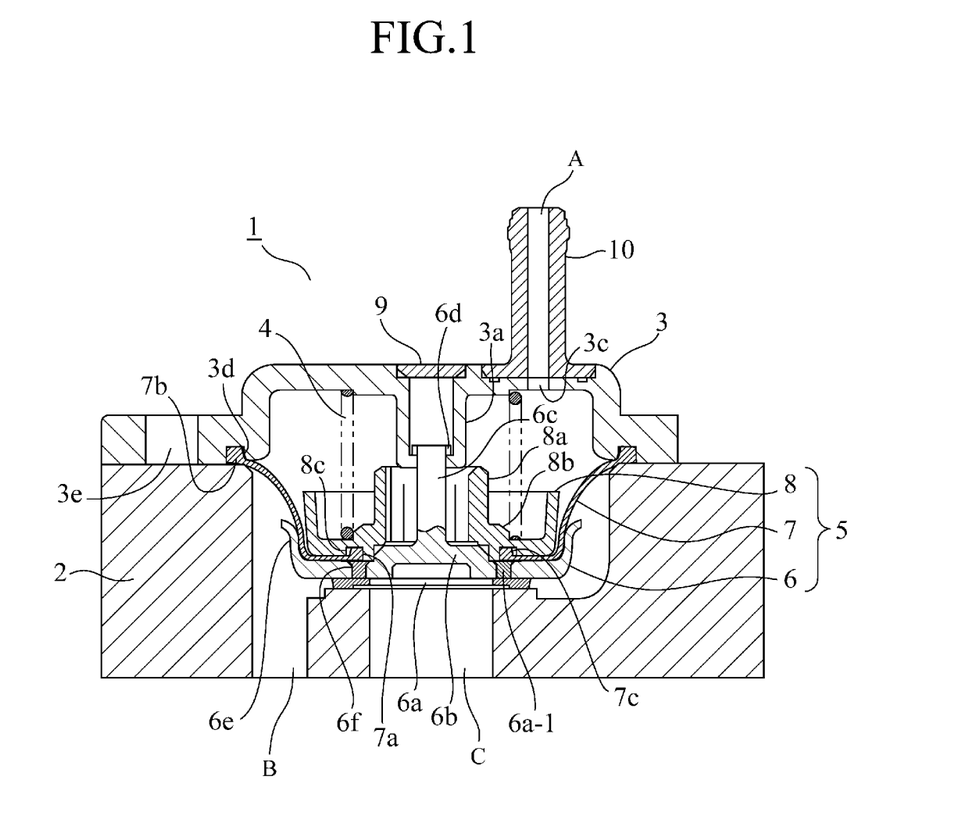
FIG. 1 is a transverse cross-sectional view illustrating a state that an air bypass valve device is directly fitted to a compressor housing of a turbo charger according to Embodiment 1 of the present invention.

An air bypass valve device 1 according to Embodiment 1 of the invention illustrated in FIG. 1 is directly installed to a compressor housing 2 of a turbo charger by a fastening unit (not depicted). The air bypass valve device 1 is composed of a case 3, a spring 4, and a valve assembly (assy) 5.

The case 3 has a bottomed cylindrical part 3a interiorly, and tenon grooves 3b are formed on the bottom surface thereof as illustrated in FIGS. 2(a)-1, 2(a)-2, 2(a)-3. Further, a nipple 10 as a pressure port A is attached to the upper surface of the case 3 such that an inner through-hole of the nipple is aligned with a through-hole 3c of the case to communicate with the through-hole 3c. Further, a cover 9 is attached to an upper end opening of the bottomed cylindrical part 3a to be closed. It is noted that a negative pressure acts on the pressure port A.

In the compressor housing 2, a pressure port B connected to an intake side of an engine (not shown) and a pressure port C connected to an air cleaner (not shown) are formed, and the valve assembly 5 is attached to the upper end of the pressure port C.

Figure 2:
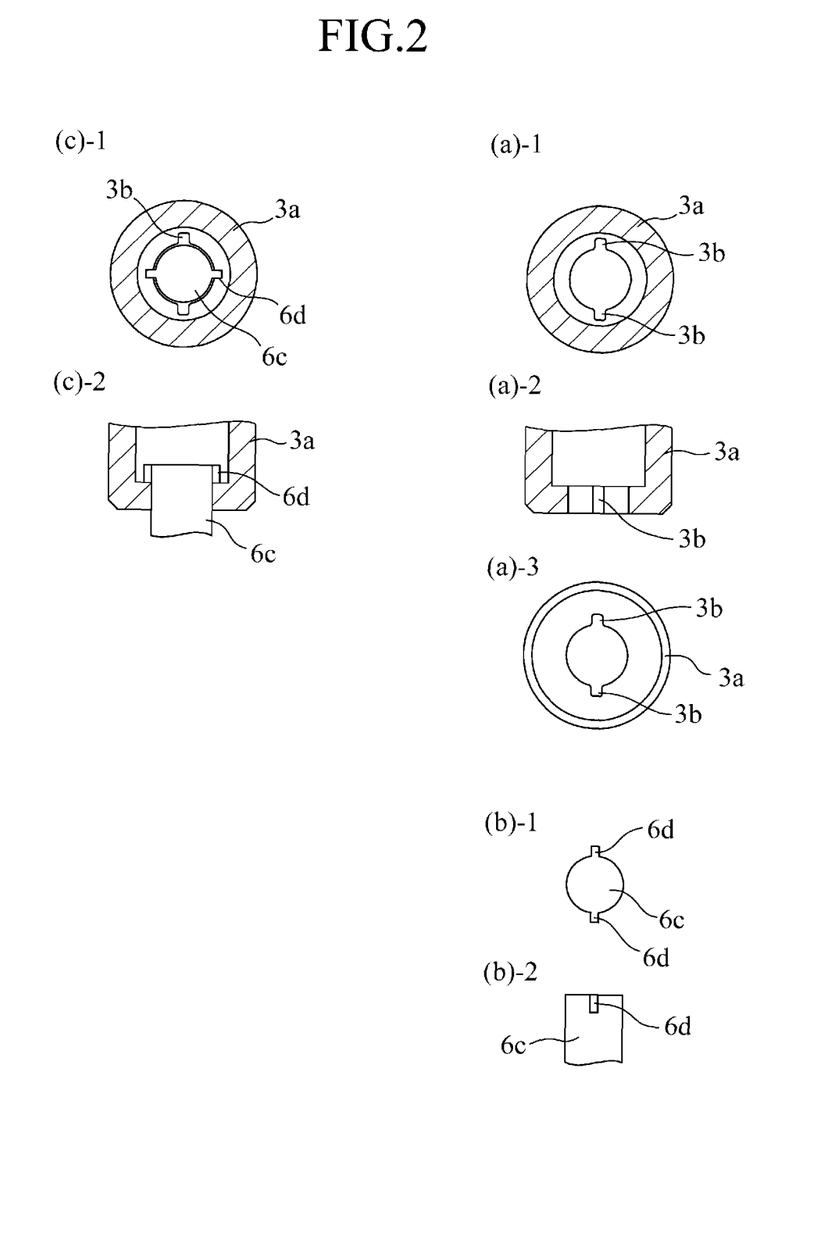
FIG. 2 is an explanatory view illustrating a tenon insertion structure of a case and a valve according to Embodiment 1 of the invention.

The valve assembly 5 is composed of a valve 6, a diaphragm 7, and a holder 8. A rubber seal 6a is attached to the central part on the lower surface of the valve 6, and the central part of the valve 6 is subjected to drawing to be convex inwardly. Then, a columnar body 6c is formed at the center of a drawing part 6b thereof, and as illustrated in FIGS. 2(b)-1, 2(b)-2, tenons 6d are provided symmetrical about an axis on the peripheral surface at the upper end of the columnar body 6c. Then, the circumferential area of the valve 6 is bent upwardly.

The diaphragm 7 has a hole 7a to be fit in by the central convex part 6b of the valve 6 at the central part on the bottom surface, the circumferential area thereof is expanded in a trumpet shape along an upwardly bent part 6e of the valve 6, and a convex part 7b is formed on the peripheral edge expanded in a trumpet shape to be engaged with a concave part 3d on the bottom surface of the case 3.

The holder 8 is formed in a cup-shape in cross-section, a cylindrical part 8a is formed at the central part thereof to accommodate the insertion of the bottomed cylindrical part 3a of the case 3, and a convex part 8b for positioning the spring 4 is formed at the base of the cylindrical part 8a. Further, a concave part 8c is formed on the lower surface thereof to be engaged with a convex part 7c formed on the periphery of the hole 7a of the diaphragm 7.

With the above arrangement of Embodiment 1, first, a convex part 6a-1 of the rubber seal 6a is integrally assembled into a hole 6f of the valve 6 by pressure compression molding and baking, then a central convex part 6b of the valve 6 is inserted and assembled into a hole 7a of the diaphragm 7, and the holder 8 is overlapped on the diaphragm 7, thus uniting three components of the valve 6, the diaphragm 7, and the holder 8 by means of bonding, welding and so on, to thereby form the valve assembly 5.

Then, as illustrated in FIGS. 2(b)-1, 2(b)-2, the directions of the tenons 6d formed on the columnar body 6c of the valve 6 that is a component of the valve assembly 5 are aligned with the tenon grooves 3b of the case 3 illustrated in FIGS. 2(a)-1, 2(a)-2, 2(a)-3, and the tenons are inserted into the bottomed cylindrical part 3a while the spring 4 interposed between the case 3 and the holder 8 is compressed. Then, the columnar body 6c and the bottomed cylindrical part 3a are relatively rotated by approximately 45 degrees to be set in the state of FIGS. 2(c)-1, 2(c)-2, and the tenons 6d are pressed on the bottom surface of the bottomed cylindrical part 3a by an elastic restoring force of the spring 4, to thereby unite the case 3 and the valve assembly 5. In the thus united state, the case 3 is mounted on an attaching place of the compressor housing 2, and attached and fixed thereto by a screw (not illustrated) through a threaded hole 3e of the case 3.

As described above, according to Embodiment 1, since the case 3 and the valve 6 are assembled by a tenon insertion structure, the flexibility of the columnar body 6c does not need to be taken into consideration, and thereby an elongated one of the body is unnecessary. As a result, the total height of the air bypass valve device 1 can be decreased to form a thinner one of the valve. Further, the case 3 and the valve assembly 5 can be transported as one part, which facilitates the handling, and fall-out or disengagement of the valve assembly 5 during transport can be prevented.

Embodiment 2

Figure 3:
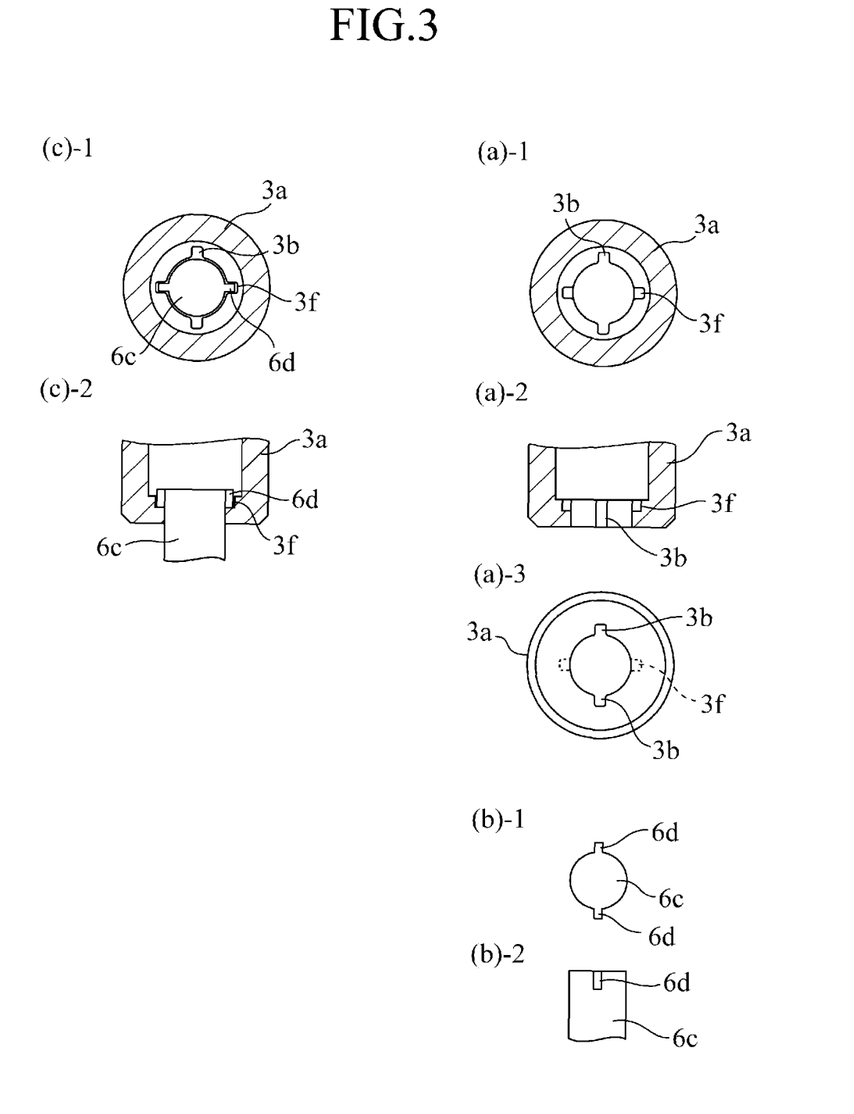
FIG. 3 is an explanatory view illustrating a tenon insertion structure of a case and a valve according to Embodiment 2 of the invention.

As illustrated in FIG. 3, in Embodiment 2, unpenetrated tenon fixing holes 3f are provided at positions orthogonal to tenon grooves 3b formed in a bottomed cylindrical part 3a of a case 3; the other arrangement is the same as that of Embodiment 1 illustrated in FIGS. 1, 2, and thereby the same signs and numerals are assigned to the same parts, and redundant explanations thereof will be omitted.

According to Embodiment 2, as illustrated in FIGS. 3(b)-1, 3(b)-2, the directions of tenons 6d formed on a columnar body 6c of a valve 6 that is a component of a valve assembly 5 are aligned with the tenon grooves 3b of the case 3 illustrated in FIGS. 3(a)-1, 3(a)-2, 3(a)-3, and the tenons are inserted into the bottomed cylindrical part 3a while a spring 4 interposed between the case 3 and a holder 8 is compressed. Then, the columnar body 6c and the bottomed cylindrical part 3a are relatively rotated by approximately 45 degrees to be set in the state of FIGS. 3(c)-1, 3(c)-2, then the tenons 6d are engaged with the tenon fixing holes 3f, and thereafter the tenons 6d are pressed into the tenon fixing holes 3f by an elastic restoring force of the spring 4, to thereby regulate a relative rotation between the columnar body 6c and the bottomed cylindrical part 3a. As a result, the following situation can be securely prevented: the columnar body 6c and the bottomed cylindrical part 3a are relatively rotated by vibration and so on during transport, and then the tenons 6d and the tenon grooves 3b are conformed with each other, so that the valve assembly 5 is fallen out from the case 3.

Embodiment 3

Figure 4:
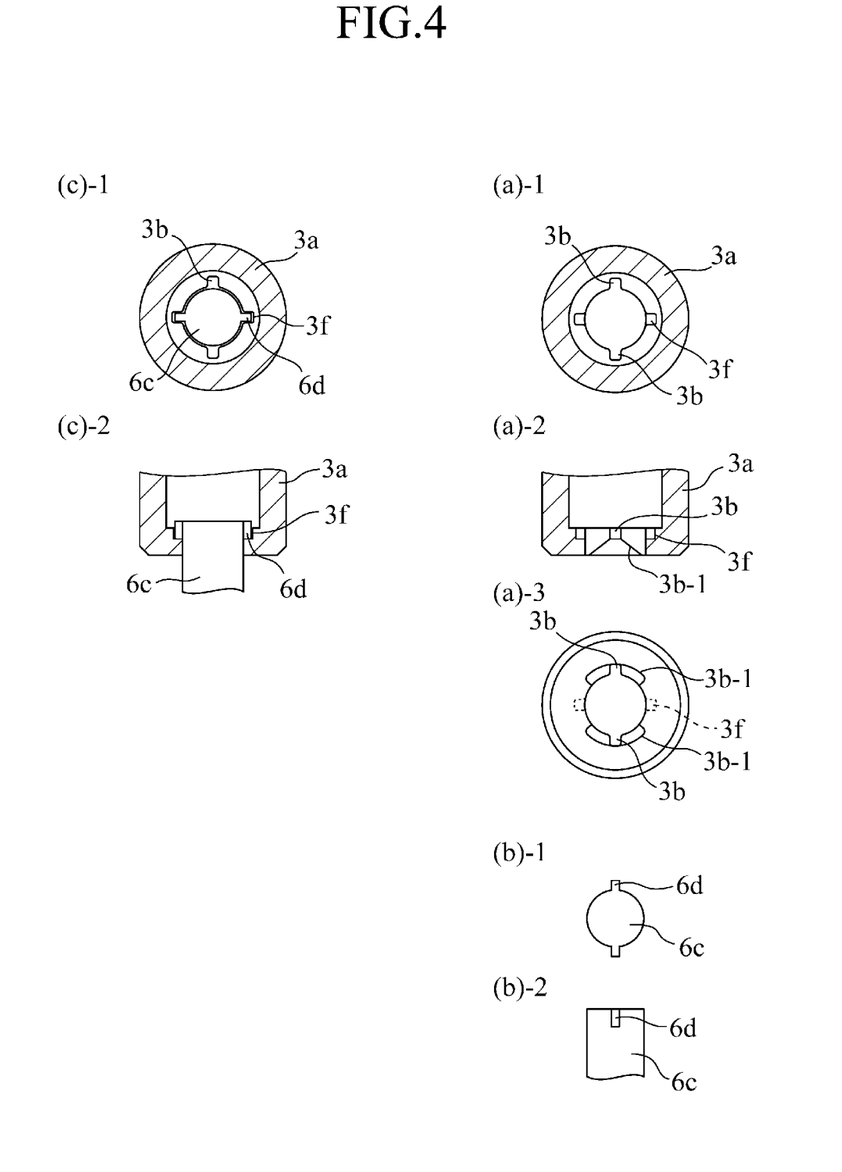
FIG. 4 is an explanatory view illustrating a tenon insertion structure of a case and a valve according to Embodiment 3 of the invention.

As illustrated in FIG. 4, in Embodiment 3, tenon grooves 3b formed on the bottom surface of a bottomed cylindrical part 3a of a case 3 are provided with openings 3b-1 which are largely opened in a trumpet shape outwardly; the other arrangement is the same as that of Embodiment 2 illustrated in FIG. 3, and thereby the same signs and numerals are assigned to the same parts, and redundant explanations thereof will be omitted.

According to Embodiment 3, as illustrated in FIGS. 4(b)-1, 4(b)-2, the directions of tenons 6d formed on a columnar body 6c of a valve 6 that is a component of the valve assembly 5 are aligned with the tenon grooves 3b of the case 3 illustrated in FIGS. 4(a)-1, 4(a)-2, 4(a)-3, and the tenons are inserted into the bottomed cylindrical part 3a while a spring 4 interposed between the case 3 and a holder 8 is compressed; in this instance, since the tenon grooves 3b are provided with the openings 3b-1 largely opened in a trumpet shape outwardly, the insertion of the tenons 6d into the tenon grooves 3b is enhanced, so that the tenon insertion can be easily carried out. Then, after the tenon insertion, the columnar body 6c and the bottomed cylindrical part 3a are relatively rotated by approximately 45 degrees to be set in the state of FIGS. 4(c)-1, 4(c)-2, then the tenons 6d are engaged with the tenon fixing holes 3f, and thereafter the tenons 6d are pressed into the tenon fixing holes 3f by the elastic restoring force of the spring 4, to thereby regulate a relative rotation between the columnar body 6c and the bottomed cylindrical part 3a. As a result, the following situation can be securely prevented: the columnar body 6c and the bottomed cylindrical part 3a are relatively rotated by vibration and so on during transport, and then the tenons 6d and the tenon grooves 3b are conformed with each other, so that the valve assembly 5 is fallen out from the case 3.

Embodiment 4

Figure 5:
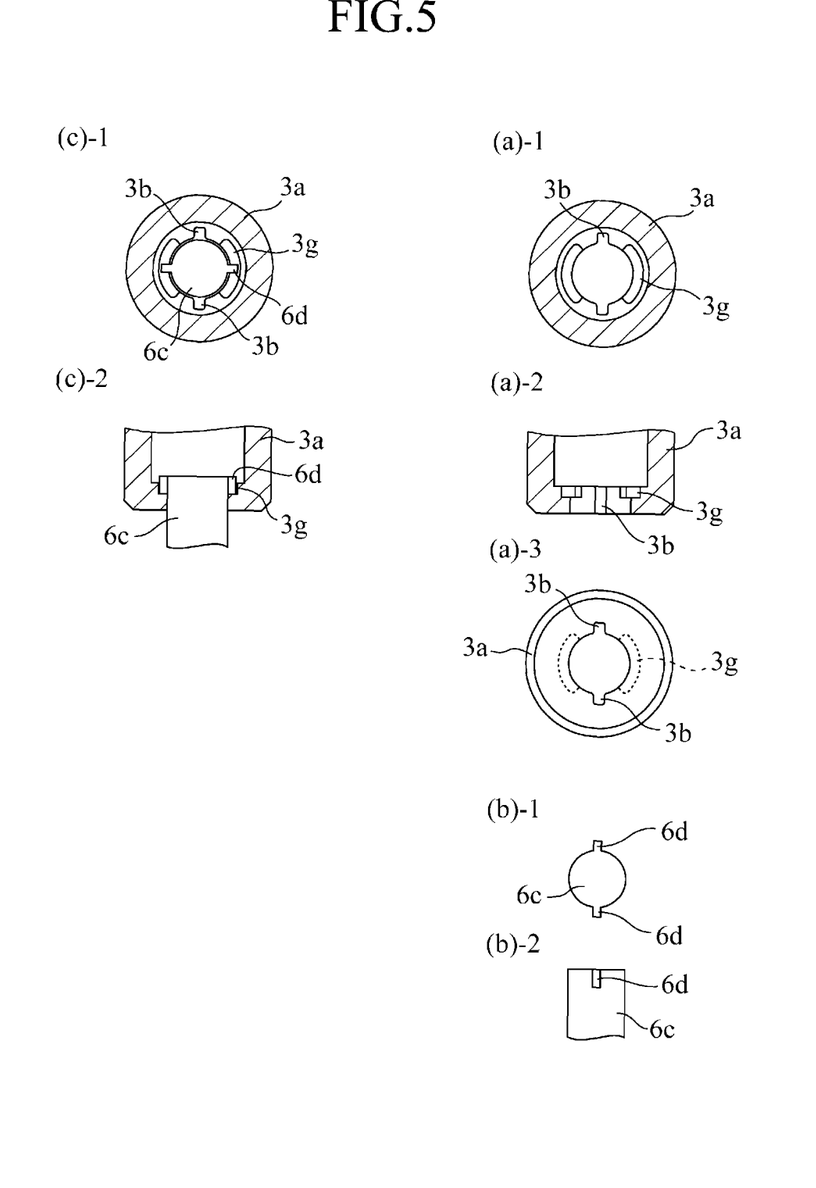

As illustrated in FIG. 5, in Embodiment 4, circumferential tenon fixing grooves 3g are provided widely in a traveling direction of tenons at positions orthogonal to tenon grooves 3b formed on a bottomed cylindrical part 3a of a case 3; the other arrangement is the same as that of Embodiment 3 illustrated in FIG. 3, and thereby the same signs and numerals are assigned to the same parts, and redundant explanations thereof will be omitted.

According to Embodiment 4, as illustrated in FIGS. 5(b)-1, 5(b)-2, the directions of tenons 6d formed on a columnar body 6c of a valve 6 that is a component of a valve assembly 5 are aligned with the tenon grooves 3b of the case 3 illustrated in FIGS. 5(a)-1, 5(a)-2, 5(a)-3, and the tenons are inserted into the bottomed cylindrical part 3a while a spring 4 interposed between the case 3 and a holder 8 is compressed. Then, after the tenon insertion, when the columnar body 6c and the bottomed cylindrical part 3a are relatively rotated, the tenons 6d are engaged with the circumferential tenon fixing grooves 3g as illustrated in FIGS. 5(c)-1, 5(c)-2. In this instance, since the tenon fixing grooves 3g are formed circumferentially, the insertion/engagement of the tenons 6d into/with the tenon fixing grooves 3g are enhanced. Then, after the engagement, the tenons 6d are pressed into the tenon fixing holes 3f by the elastic restoring force of the spring 4, which are regulated owing to a relative rotation between the columnar body 6c and the bottomed cylindrical part 3a within the tenon fixing grooves 3g. As a result, the following situation can be securely prevented: the columnar body 6c and the bottomed cylindrical part 3a are relatively rotated by vibration and so on during transport, and then the tenons 6d and the tenon grooves 3b are conformed with each other, so that the valve assembly 5 is fallen out from the case 3.

Embodiment 5

Figure 6:
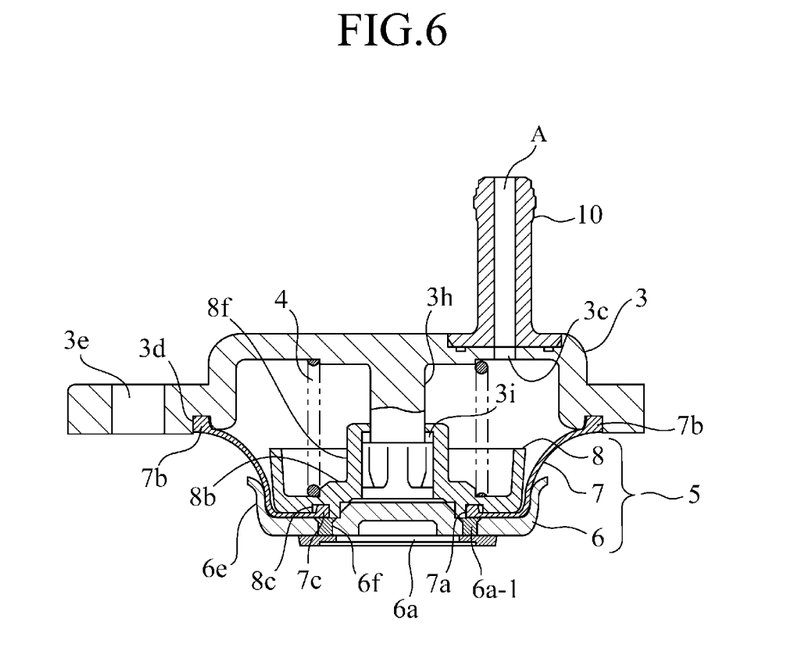
FIG. 6 is a transverse cross-sectional view illustrating an air bypass valve device according to Embodiment 5 of the invention.
Figure 7:
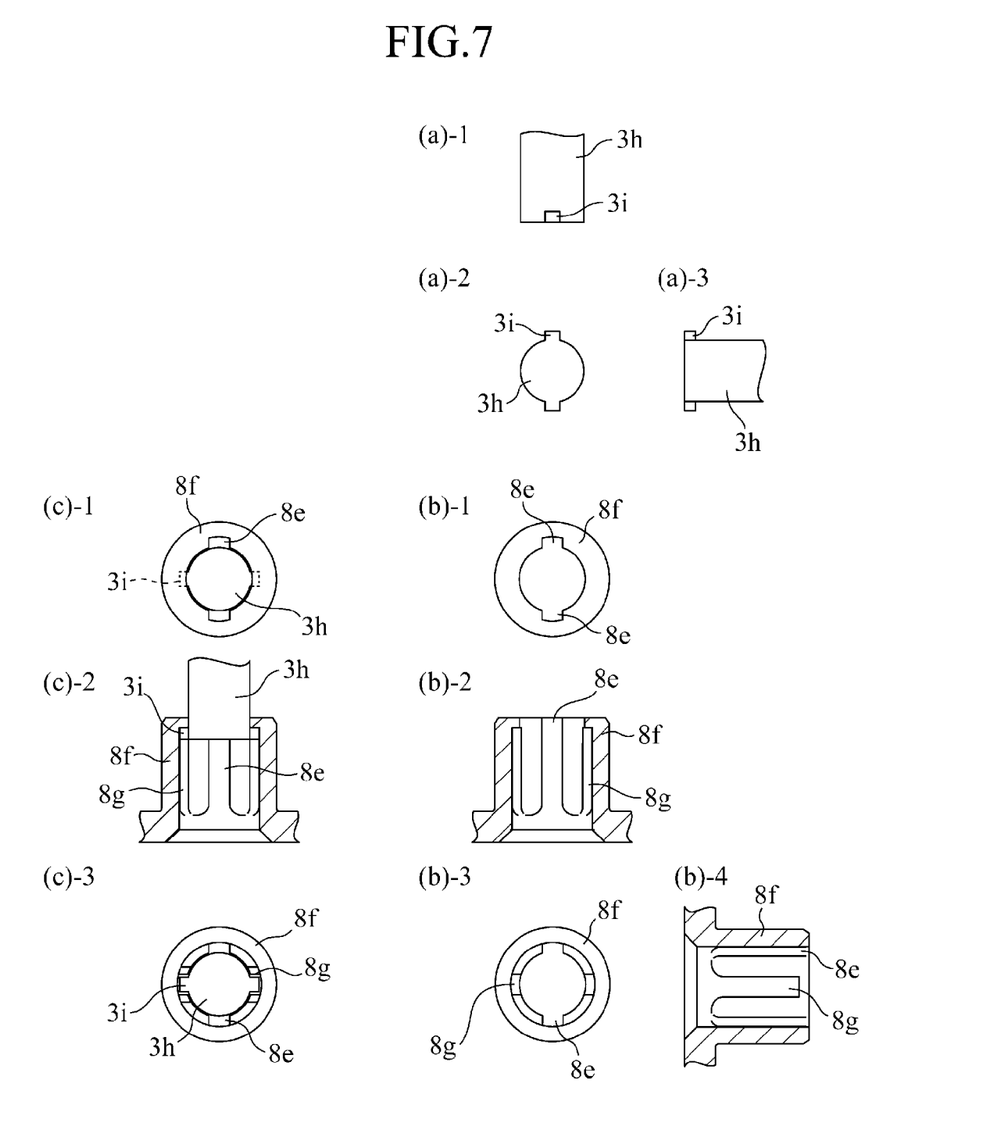
FIG. 7 is an explanatory view illustrating a tenon insertion structure of a case and a holder according to Embodiment 5 of the invention.

An air bypass valve device 1 according to Embodiment 5 of the invention illustrated in FIG. 6 is composed of a case 3, a spring 4, and a valve assembly 5.

The case 3 has a columnar body 3h interiorly, and as illustrated in FIGS. 7(a)-1, 7(a)-2, 7(a)-3, tenons 3i are provided symmetrical about an axis on the peripheral surface at the lower end of a columnar body 3h. Further, a nipple 10 as a pressure port A is attached to the upper surface of the case 3 such that an inner through-hole of the nipple is aligned with a through-hole 3c of the case to communicate with the through-hole.

The valve assembly 5 is composed of a valve 6, a diaphragm 7, and a holder 8. A reinforcing plate 6a is attached to the central part on the lower surface of the valve 6, and the central part of the valve 6 is subjected to drawing to be convex inwardly. Then, the peripheral part of the valve 6 is bent upwardly.

The diaphragm 7 has a hole 7a to be fit in by the central convex part 6b of the valve 6, the peripheral part thereof is expanded in a trumpet shape along an upwardly bent part 6e of the valve 6, and a convex part 7b is formed on the peripheral edge of the part expanded in a trumpet shape to be engaged with a concave part 3d on the bottom surface of the case 3.

The holder 8 is formed in a cup-shape in cross-section, a cylindrical part 8f is formed at the central part thereof, and tenon grooves 8e opened to the upper end face thereof are provided symmetrical about an axis inside the cylindrical part, and tenon sliding grooves 8g are formed in parallel to the tenon grooves 8e to communicate with the tenon grooves at the lower end thereof, but are unpenetrated at the upper end thereof. Then, a convex part 8b for positioning the spring 4 is formed at the base of the cylindrical part 8f. Further, a concave part 8c is formed on the lower surface thereof to be engaged with a convex part 7c formed on the periphery of a hole 7a of the diaphragm 7.

With the above arrangement of Embodiment 5, first, a convex part 6a-1 of the rubber seal 6a is inserted into a hole 6f of the valve 6 to be integrally assembled, then the central convex part 6b of the valve 6 is engaged with the hole 7a to assemble the diaphragm 7, and the holder 8 is overlapped on the diaphragm 7, so that three components of the valve 6, the diaphragm 7, and the holder 8 are united by means of bonding, welding and so on, to thereby form the valve assembly 5.

Then, as illustrated in FIGS. 7(b)-1, 7(b)-2, 7(b)-3, 7(b)-4, the directions of the tenon grooves 8e of the cylindrical part 8f of the holder 8 constituting the valve assembly 5 are aligned with the tenons 3i of the case 3 illustrated in FIGS. 7(a)-1, 7(a)-2, 7(a)-3, and the tenons are inserted thereinto while the spring 4 interposed between the case 3 and the holder 8 is compressed. Then, after the tenons 3i is inserted thereinto to reach the terminal ends of the tenon grooves 8e, the case 3 and the valve assembly 5 are relatively rotated by approximately 45 degrees, so that the tenons 3i are matched with the tenon sliding grooves 8g of which are unpenetrated at the upper end thereof; then, the tenons 3i are traveled inside the tenon sliding grooves 8g by the elastic restoring force of the spring 4 to be pressed on the inner surfaces of the unpenetrated upper ends of the tenon sliding grooves 8g as illustrated in FIGS. 7(c)-1, 7(c)-2, 7(c)-3, to thereby unite the case 3 and the valve assembly 5. In the thus united state, the case 3 is mounted on an attaching place of the compressor housing 2 (see FIG. 1), and attached and fixed thereto by a fastening means such as screwing, bonding, and welding.

As described above, according to Embodiment 1, since the case 3 and the valve 6 are assembled by a tenon insertion structure, the flexibility of the columnar body 3h does not need to be taken into consideration, and thereby an elongated one of the body is unnecessary. As a result, the total height of the air bypass valve device 1 can be decreased to form a thinner one, and thereby mountability thereof on vehicles is enhanced. Further, fall-out of the valve assembly 5 during transport can be prevented.

Embodiment 6

Figure 8:
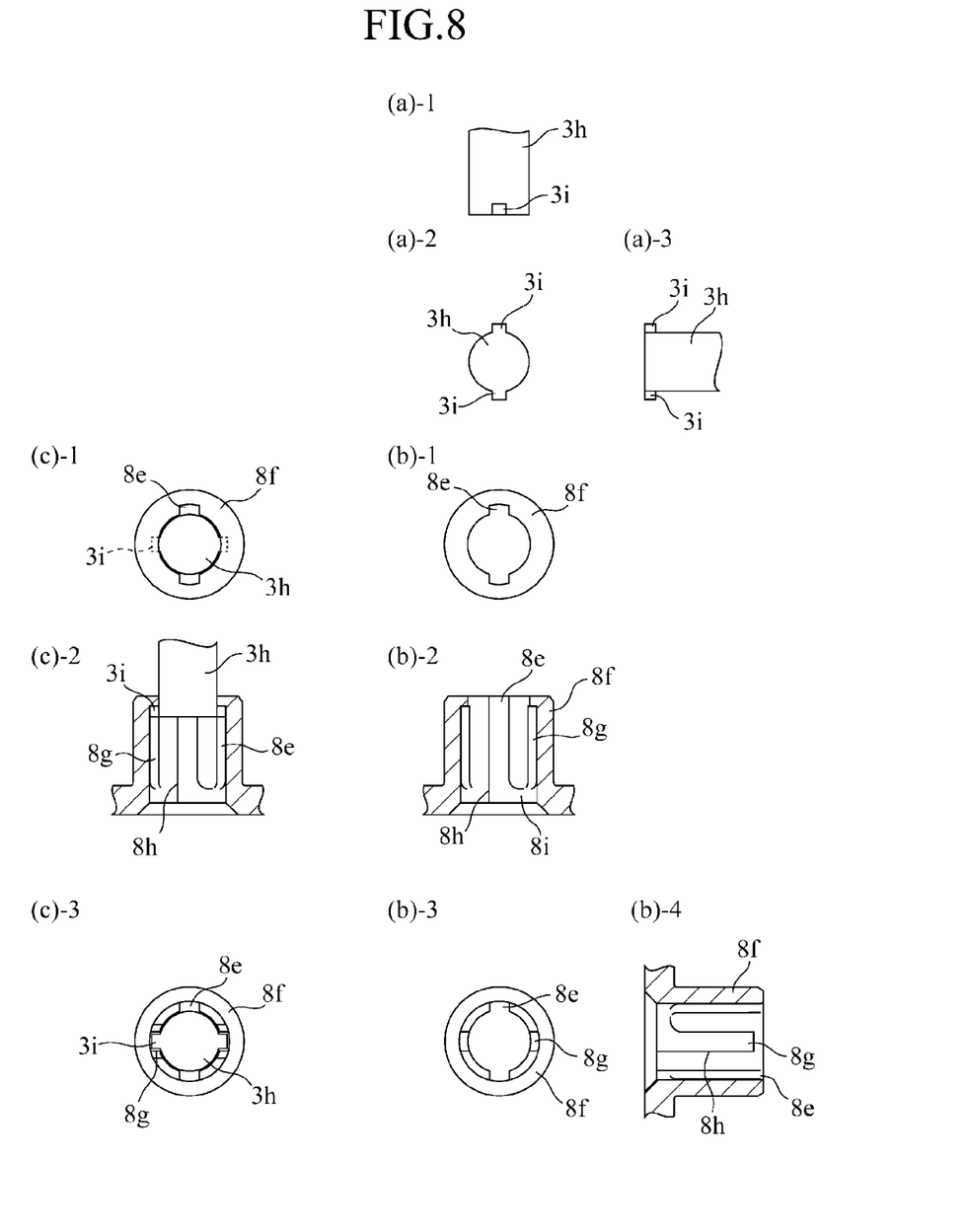
FIG. 8 is an explanatory view illustrating a tenon insertion structure of a case and a holder according to Embodiment 6 of the invention.

As illustrated in FIG. 8, in Embodiment 6, a rotating direction regulating side wall 8h is provided on one side of the terminal ends of tenon grooves 8e which are formed inside a cylindrical part 8f of a holder 8, and a communication groove 8i is provided only in one direction to communicate with the tenon sliding groove 8g unpenetrated at the upper end thereof; the other arrangement is the same as that of Embodiment 5 illustrated in FIG. 6, and thereby the same signs and numerals are assigned to the same parts, and redundant explanations thereof will be omitted.

According to Embodiment 6, as illustrated in FIGS. 8(b)-1, 8(b)-2, 8(b)-3, 8(b)-4, the directions of the tenon grooves 8e of the cylindrical part 8f of the holder 8 constituting the valve assembly 5 are aligned with the tenons 3i of the case 3 illustrated in FIGS. 8(a)-1, 8(a)-2, 8(a)-3, and the tenons are inserted thereinto while the spring 4 interposed between the case 3 and the holder 8 is compressed. Then, after the tenons 3i is inserted thereinto to reach the terminal ends of the tenon grooves 8e, the case 3 and the valve assembly 5 are relatively rotated by approximately 45 degrees, so that the tenons 3i are matched with the tenon sliding grooves 8g of which are unpenetrated at the upper end thereof; subsequently, the tenons 3i are traveled inside the tenon sliding grooves 8g by the elastic restoring force of the spring 4 to be pressed on the inner surfaces at the unpenetrated upper ends of the tenon sliding grooves 8e as illustrated in FIGS. 8(c)-1, 8(c)-2, 8(c)-3, to thereby unite the case 3 and the valve assembly 5. In this instance, the rotation of the case 3 and the valve assembly 5 is regulated by the rotation regulating side wall 8h, and therefore the tenons 3i and the tenon grooves 8e are easily matched with each other during assembly, so that the assembly work can be performed simply and rapidly. After the assembly, the situation that the valve assembly 5 is fallen out from the case 3 can be securely prevented.

Embodiment 7

Figure 9:
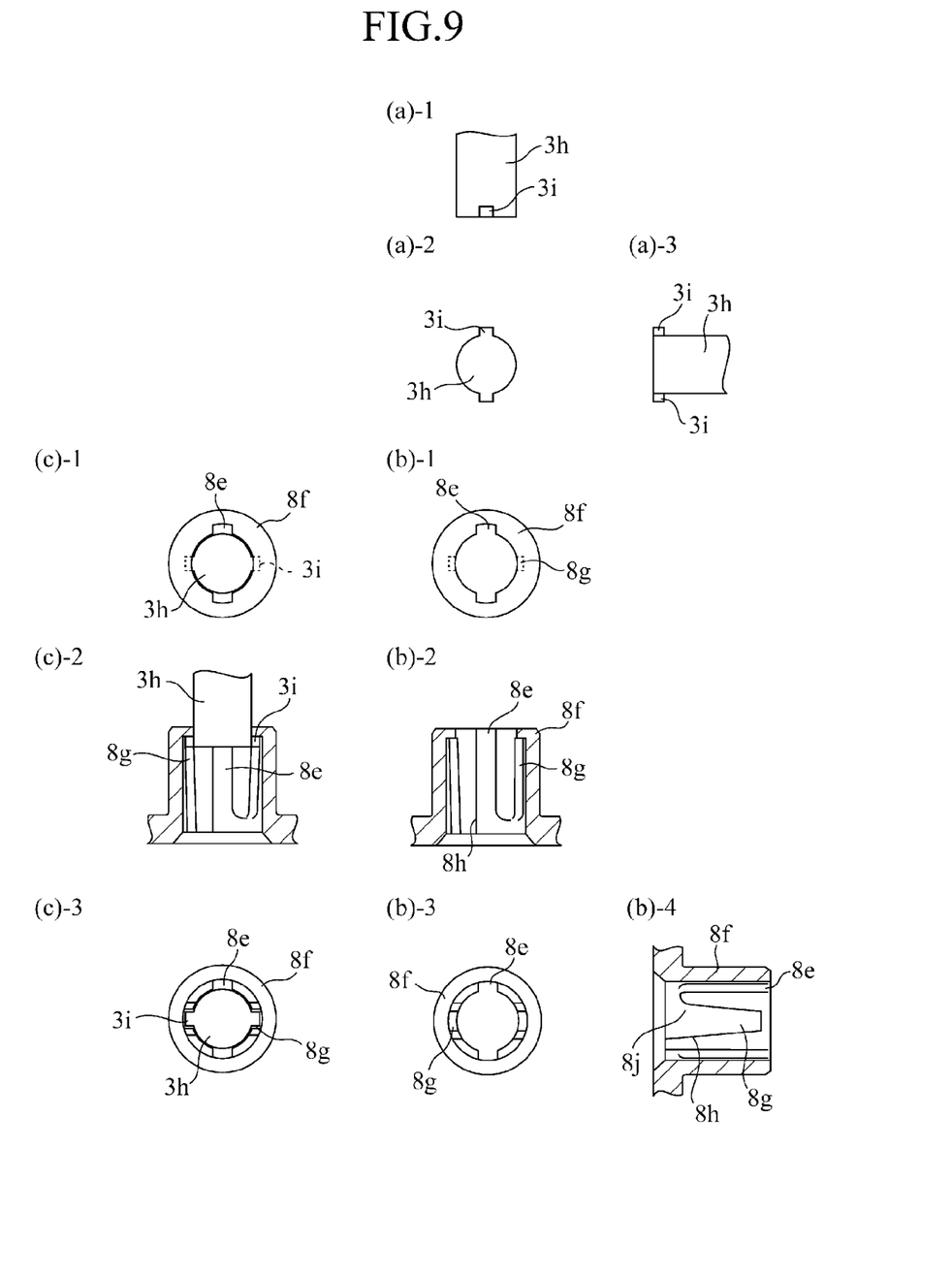
FIG. 9 is an explanatory view illustrating a tenon insertion structure of a case and a holder according to Embodiment 7 of the invention.

As illustrated in FIG. 9, in Embodiment 7, a large guiding space 8j is provided on the entrance of tenon sliding grooves 8g unpenetrated at the upper ends thereof to communicate with the terminal ends of the tenon grooves 8e which are formed inside a cylindrical part 8f of a holder 8; the other arrangement is the same as that of Embodiment 6 illustrated in FIG. 8, and thereby the same signs and numerals are assigned to the same parts, and redundant explanations thereof will be omitted.

According to Embodiment 7, as illustrated in FIGS. 9(b)-1, 9(b)-2, 9(b)-3, 9(b)-4, the directions of the tenon grooves 8e of the cylindrical part 8f of the holder 8 constituting the valve assembly 5 are aligned with the tenons 3i of the case 3 illustrated in FIGS. 9(a)-1, 9(a)-2, 9(a)-3, and the tenons are inserted thereinto while the spring 4 interposed between the case 3 and the holder 8 is compressed. Then, after the tenons 3i is inserted thereinto to reach the terminal ends of the tenon grooves 8e, when the case 3 and the valve assembly 5 are relatively rotated in one rotatable direction, the tenons 3i enter into the tenon sliding grooves 8g under guidance of the large guiding space 8j which is positioned at the entrance part of the tenon sliding grooves 8g unpenetrated at the upper ends thereof. After the entering, the tenons 6d are traveled inside the tenon sliding grooves 8g by the elastic restoring force of the spring 4 to be pressed on the inner surface at the unpenetrated upper ends of the tenon sliding grooves 8g as illustrated in FIGS. 9(c)-1, 9(c)-2, 9(c)-3, to thereby unite the case 3 and the valve assembly 5. As a result, the insertion of the tenons 3i into the tenon sliding grooves 8g is facilitated and secured, which increases the working efficiency in the assembly of the case 3 and the valve assembly 5. After the assembly, the situation that the valve assembly 5 is fallen out from the case 3 can be securely prevented.

Embodiment 8

Figure 10:
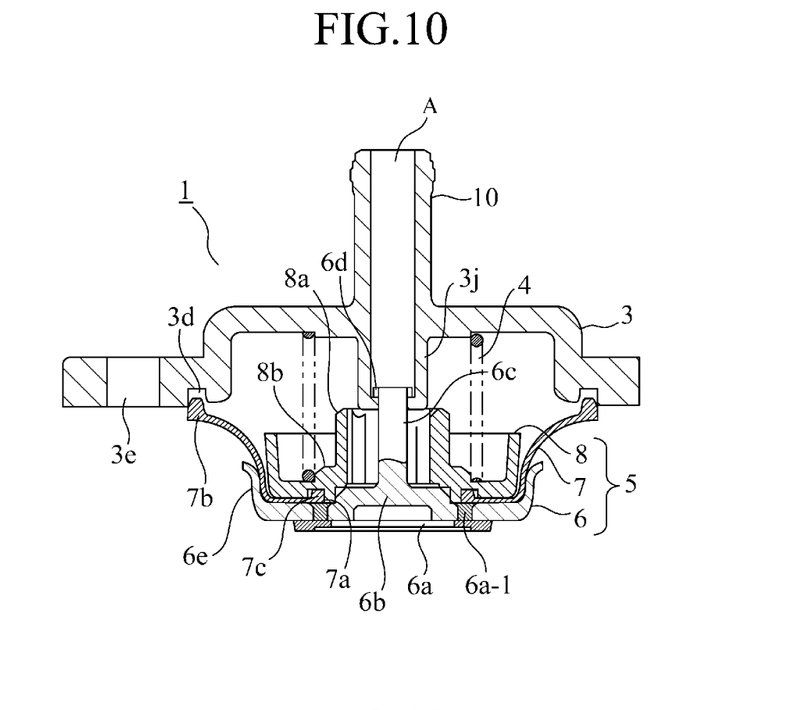
FIG. 10 is a transverse cross-sectional view illustrating an air bypass valve device according to Embodiment 8 of the invention.

An air bypass valve device 1 according to Embodiment 8 of the invention illustrated in FIG. 10 is composed of a case 3, a spring 4, and a valve assembly 5.

The case 3 has a bottomed cylindrical part 3j interiorly, and as illustrated in FIGS. 2(a)-1, 2(a)-2, 2(a)-3, the tenon grooves 3b are formed on the bottom surface. Further, a nipple 10 functioning as a pressure port A is formed on the upper surface of the case 3 to communicate with the inside of the bottomed cylindrical part 3j. Since a spring 4 and a valve assembly 5 are the same as those of Embodiment 1, the same signs and numerals are assigned to the same parts, and redundant explanations thereof will be omitted.

According to Embodiment 8, the nipple 10 is integrally formed with the case 3. Therefore, the number of components can be reduced, and the operation and effect in Embodiment 1 can be obtained.

Embodiment 9

Figure 11:
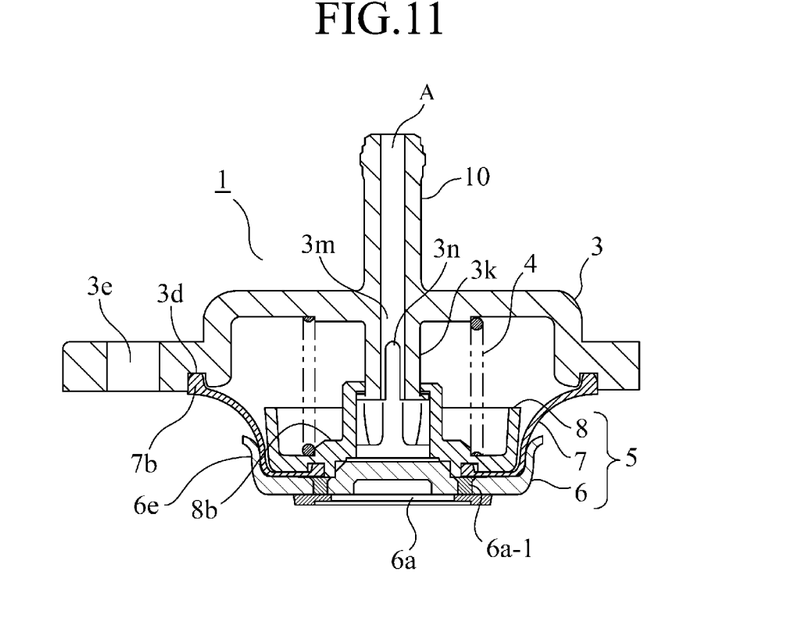
FIG. 11 is a transverse cross-sectional view illustrating an air bypass valve device according to Embodiment 9 of the invention.
Figure 12:
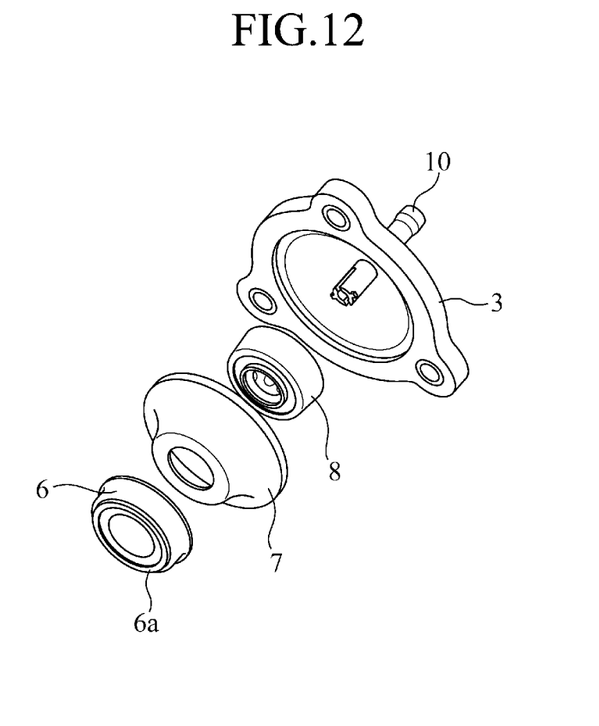
FIG. 12 is an exploded perspective view of an air bypass valve device according to Embodiment 9.

FIG. 11 is a sectional view showing an air bypass valve device 1 according to Embodiment 9 of the invention, and FIG. 12 is an exploded perspective view of constitutional components thereof, wherein the air bypass valve device 1 is composed of a case 3, a spring 4, and a valve assembly 5. Then, the feature in which a nipple 10 is integrally formed with the case 3 is the same as that of Embodiment 8.

Figure 13:
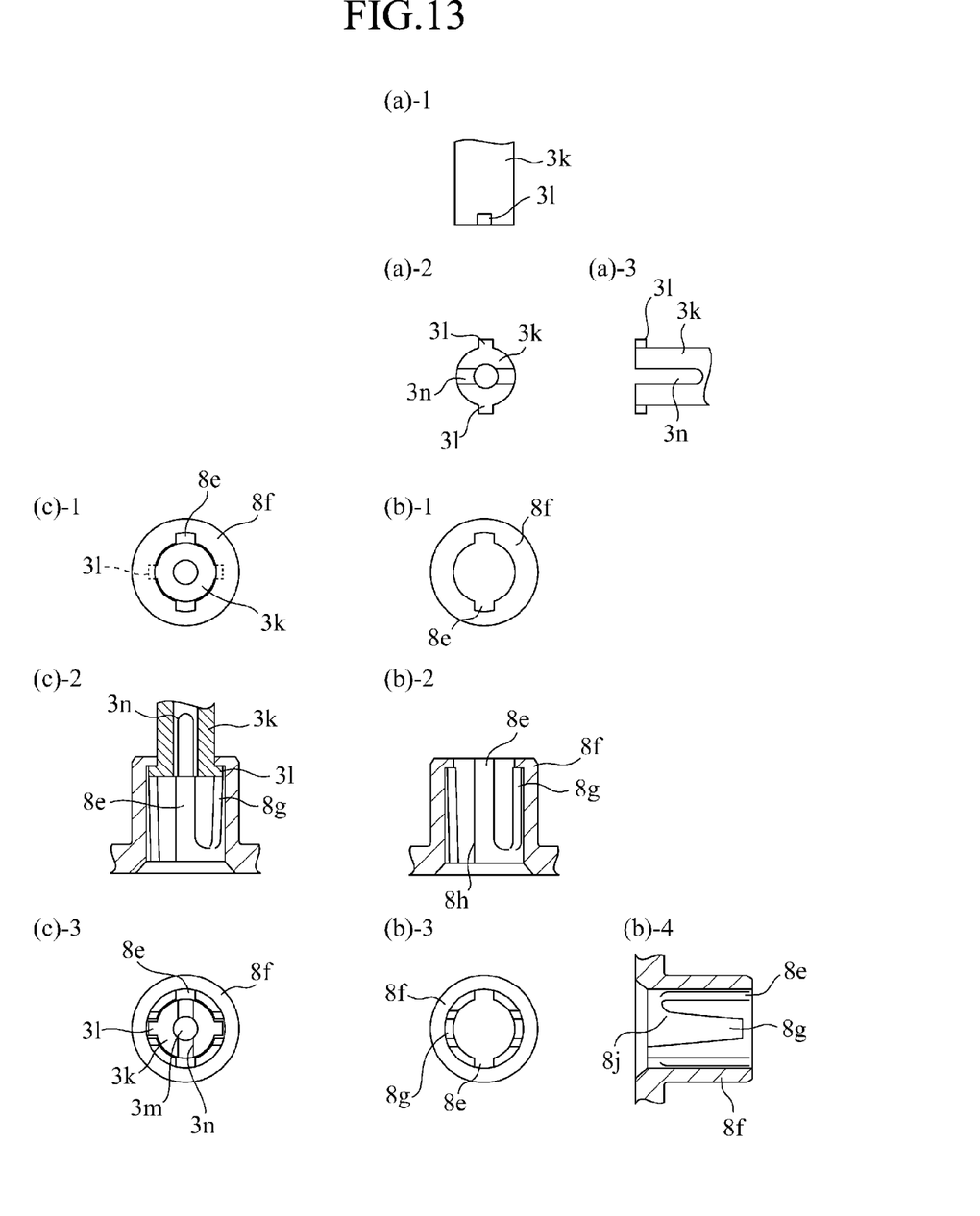
FIG. 13 is an explanatory view illustrating a tenon insertion structure of a case and a holder according to Embodiment 9 of the invention.

The case 3 has a cylinder body 3k interiorly, and as illustrated in FIGS. 13(*a*)-1, 13(*a*)-2, 13(*a*)-3, tenons 3l are formed symmetrical about an axis on the peripheral surface at the lower end of the cylinder body 3k, and a space 3m is formed inside the cylinder body 3k to communicate with the inside of the nipple 10 functioning as a pressure port A which is formed on the upper surface of the case 3. Further, in the vicinity where the tenons 3l are formed on the peripheral surface at the lower end of the cylinder body 3k, a pressure introducing groove 3n is formed at a position orthogonal to the tenons 3l with penetrating from inside to outside.

According to Embodiment 9, as illustrated in FIGS. 13(*b*)-1, 13(*b*)-2, 13(*b*)-3, 13(*b*)-4, the directions of the tenon grooves 8e of the cylindrical part 8f of the holder 8 constituting the valve assembly 5 are aligned with the tenons 3l of the case 3 illustrated in FIGS. 13(*a*)-1, 13(*a*)-2, 13(*a*)-3, and the tenons are inserted thereinto while the spring 4 interposed between the case 3 and the holder 8 is compressed. Then, after the tenons 3l are inserted thereinto to reach the terminal ends of the tenon grooves 8e, when the case 3 and the valve assembly 5 are relatively rotated in one rotatable direction, the tenons 3l enter into the tenon sliding grooves 8e under guidance of a large guiding space 8j which is positioned at the entrance part of the tenon sliding grooves 8e unpenetrated at the upper ends thereof. After the entering, the tenons 3l are traveled inside the tenon sliding grooves 8e by the elastic restoring force of the spring 4 to be pressed on the inner surface at the unpenetrated upper ends of the tenon sliding grooves 8e as illustrated in FIGS. 13(*c*)-1, 13(*c*)-2, 13(*c*)-3, to thereby unite the case 3 and the valve assembly 5.

As a result, owing to the communication between the space in the case 3 and a central hole of the nipple 10 through the pressure introducing groove 3n, the pressure in the case 3 rapidly follows a change of pressure in the nipple 10, which increases the working response thereof. Further, the insertion of the tenons 3l into the tenon sliding grooves 8e is facilitated and secured under the guidance of the guiding space 8j, and therefore the working efficiency in the assembly of the case 3 and the valve assembly 5 is increased. After the assembly, the situation that the valve assembly 5 is fallen out from the case 3 can be surely prevented. Moreover, since the nipple 10 and the case 3 are integrally formed, the number of parts can be reduced, and the operation and effect in Embodiment 1 can be obtained.

INDUSTRIAL APPLICABILITY

As described above, in the air bypass valve device 1 of the present invention, the valve assembly 5 is assembled to the case 3 by the tenon insertion structure, and thereby parts thereof can be maintained at a fixed height without affected by the materials of the parts, and therefore the device is suitable for a vehicle-mounted one.

The invention claimed is:

1. An air bypass valve device, comprising:
  a valve assembly in which three components of a valve for opening and closing a pressure port on a turbo charge side, a holder, and a diaphragm interposed between the valve and the holder are integrally formed;
  a case in which the valve assembly is fitted, the case having a bottomed cylinder body, formed on an inner surface of the case, with an entrance and a tenon groove that are provided at a lower bottom of the bottomed cylinder body;
  a compression spring provided between the valve assembly and the case;
  the valve having a columnar body formed at the central part of the valve and extending toward the case, the columnar body having a tenon radially protruding from a peripheral surface of an upper end portion of the columnar body; and
  the bottomed cylinder body having a tenon fixing concave part for receiving the tenon, the tenon fixing concave part being provided on the lower bottom of the bottomed cylinder body at a position different from that of the tenon groove, and extending in either or both of the clockwise and counter clockwise directions of the bottomed cylinder body, thereby allowing a movement of the tenon in the tenon fixing concave part in the clockwise/counter clockwise directions,
  wherein the tenon is received in the tenon fixing concave part by inserting the columnar body into the entrance with the tenon aligned with the tenon groove against an elastic force of the compression spring, rotating the columnar body with respect to the bottomed cylinder body, and releasing the columnar body.

2. The air bypass valve device according to claim 1, wherein the entrance is widely opened compared to the circumference of the columnar body for easy insertion of the columnar body.

3. The air bypass valve device according to claim 1, wherein a pressure port for communicating with the inside of a bottomed cylinder body is integrally formed with the case.

4. The air bypass valve device according to claim 3, wherein a pressure introducing groove is formed in the bottomed cylinder body.

5. An air bypass valve device, comprising:
  a valve assembly in which three components of a valve for opening and closing a pressure port on a turbo charge side, a holder, and a diaphragm interposed between the valve and the holder are integrally formed;
  a case in which the valve assembly is fitted, the case having a columnar body formed on an inner surface of the case and extending toward the valve assay, the columnar body having a tenon radially protruding from a peripheral surface of a lower end portion of the columnar body;
  a compression spring provided between the valve assembly and the case;
  a bottomed cylinder body formed at a central part of the holder, with an entrance and a tenon groove that are provided at an upper bottom of the cylinder body, the bottomed cylinder body having a tenon fixing concave part for receiving the tenon, the tenon fixing concave part being provided on the upper bottom of the bottomed cylinder body at a position different from that of the tenon groove, and extending in either or both of the clockwise and counter clockwise directions of the bottomed cylinder body, thereby allowing a movement of the tenon in the tenon fixing concave part in the clockwise/counter clockwise directions wherein the tenon is received in the tenon fixing concave part by inserting the columnar body into the opening with the tenon aligned with the tenon groove against an elastic force of the compression spring, rotating the columnar body with respect to the bottomed cylinder body, and releasing the columnar body.

6. The air bypass valve device according to claim 5, wherein the bottomed cylinder body has a side wall that defines the tenon fixing groove and extended to the upper bottom controlling a rotation of the tenon in either of the clockwise and counter clockwise direction.

7. The air bypass valve device according to claim 5, wherein the entrance is widely opened compared to the circumference of the columnar body for easy insertion of the columnar body.

8. An air bypass valve device, comprising:
 a valve assembly in which three components of a valve for opening and closing a pressure port on a turbo charge side, a holder, and a diaphragm interposed between the valve and the holder are integrally formed;
 a case in which the valve assembly is fitted, the casing having a columnar body formed on an inner surface of the case;
 at least one tenon symmetrically protruding from a peripheral surface of a lower end portion of the columnar body;
 a bottomed cylinder body formed in a holder positioned at a central part on a surface of the valve;
 at least one tenon groove formed on an inner surface of the cylinder body, the tenon groove extending along a first direction and having a terminal end; and
 at least one tenon sliding groove formed on an inner surface of the cylinder body, the tenon fixing groove, the tenon sliding groove extending along first and second directions and having a first end connected to the terminal end of the tenon groove and an unpenetrated terminal end;
 wherein the tenon is configured to be inserted into the tenon groove and slide along the tenon sliding groove thereby rotating the case and uniting the valve assembly and the case.

\* \* \* \* \*